Figure 1:
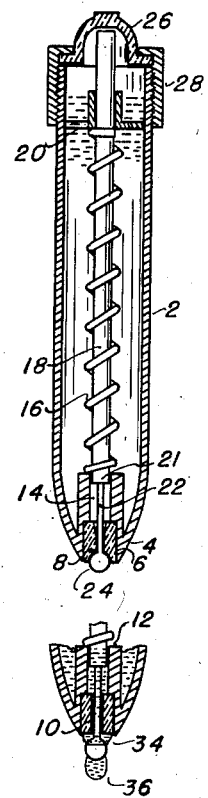

April 28, 1942.     A. J. ROGER     2,281,051

DROP METER AND DISPENSER

Filed May 20, 1940

ALBERT J. ROGER
*INVENTOR.*

BY *[signature]*
*ATTORNEY*

Patented Apr. 28, 1942

2,281,051

UNITED STATES PATENT OFFICE 2,281,051

DROP METER AND DISPENSER

Albert J. Roger, Oakland, Calif.

Application May 20, 1940, Serial No. 336,279

3 Claims. (Cl. 221—148)

This invention relates to dispensers for delivering small quantities of liquids such as soaps, foods, medicines and the like and is particularly concerned with providing a normally portable vessel by means of which a definite quantity of fluid is metered and released from the vessel with a single pressure movement on a portion of the vessel itself and which quantity of liquid becomes available as one or a series of drops successively and controllably dropped from an applicator tip forming a portion of the dispenser.

This invention contemplates minimum costs of construction, the employment of moldable materials of attractive appearance, and an arrangement of parts such that progressive assembly of the dispenser is facilitated either for machine assembly, for manual assembly, or for any combination of machine and manual assembly.

The invention contemplates the provision in a dispenser of characteristics such that a definite quantity of fluid is first dispensed, and air is permitted to enter the dispenser to replace the dispensed ration of fluid only after the dispensing phase is completed. Moreover, the displacing air is immediately removed from the metering outlet portion of the dispenser so that only liquid remains in the meter chamber, thus insuring a definite quantity of liquid to be measured out at each operation of the dispensing mechanism.

The invention is particularly concerned with the dispensing of drops; one, two, or more, as desired by the user. The applicator tip is, in the preferred embodiment, pointed, and contains a composite valve, drop applicator, and means for separating the liquid metered through the valve port, into equal separate and distinct drops, irrespective of the force applied by the operator, or the total quantity metered out at each complete stroke. By the principle of this invention, complete control of the drops is held by the user.

Figure 3:
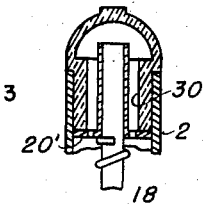
Figure 4:
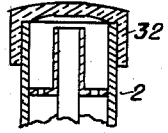
Figure 2:
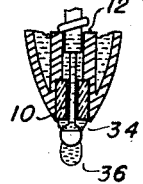
Figure 5:
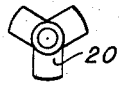

In the drawing:

Figure 1 is a sectional elevation of a dispenser;
Figure 2 is a fragmentary view of the dispenser tip in open position; and Figures 3 and 4 illustrate modifications of the actuator diaphragm;
Figure 5 is a detail in plan.

The dispenser comprises a fluid containing shell 2 molded of a material such as polystyrene, of cylindrical and convergent shape to form an applicator end 4 having a recess 6 of preferably cylindrical form for receiving a cylindrical rubber sleeve 8, the rubber being preferably of the synthetic "Neoprene" to form a valve seat and resilient fluid orifice 10. A reentrant boss 12 forms a metering and dashpot cylinder 14 in extension of the orifice 10 as well as a spring abutment for a spring 16, surrounding the preferably Monel metal plunger 18, bearing against a guide spider 20 secured to the plunger.

The lower end 21 of plunger 18 fits as a piston with only slight clearance into the interior end of metering and dashpot cylinder 14, the proportion being such that displacement air in chamber 14 may pass between the cylinder and the piston ends when in the position of Figure 1 while orifice 10 is closed whereby the fluid enters the meter chamber 14 to replace the displacement air.

Integral with piston 21 is valve stem 22 passing through the meter chamber and through orifice 10 formed by sleeve 8 and terminating in a round valve 24 of preferably spherical shape which normally seats against and seals the valve seat in its recess.

Plunger 18 extends upwardly and is disposed for engagement by a flexible sealing diaphragm 26 of rubber or the like secured to the top end of the shell 2 as by flanged fitting 28 in a manner to be pressed by the fingers into engagement with the plunger 18.

With valve head 24 larger in diameter than, and the plunger smaller in diameter than, the cylinder 14, assembly is accomplished from the bottom end.

The sleeve 8 is first forced over the valve head 24 onto stem 22 and this assembly inserted from the lower end, the spring 16 and washer 20 being emplaced and secured from the upper end. As soon as washer 20 is fixed the lower end of the dispenser is sealed in the manner illustrated in Figure 1 and the contents may be filled in. The ball 24 deforms the pliable seat in such a manner as to form a seal not only against the ball surface but along the stem as well. By making the ball smaller than cylinder 14 the plunger and spring assembly may be inserted from the top.

In Figure 1 the top is shown as fastened by screw threading and to be of two parts so that fluid may largely fill the container without placing it under pressure. In the modifications of Figures 3 and 4 the closure and fastener are integral, the fastener 30 fitting interiorly and expanding as a cork, and 32 surrounding and gripping the shell end.

In operation diaphragm 26 is pressed inward by the user to engage plunger 18 and force it, against the force of spring 16 downwardly to close the inner end of the metering chamber 14 and concurrently force fluid interiorly of the sleeve 8 to expand it against its seating recess and hold it in place. Upon unseating the ball 24 the fluid seeps out and collects as at 34 in adhering relation to the ball and the valve seat. Continued movement of the piston causes the drops 36 to form and travel around the ball downwardly as shown, the instant of separation from portion 34 being fixed as a constant for all drops. The portion 34 remains constant until further displacement of the plunger 21, and upon upward movement of the plunger, the portion 34 is retracted into the chamber 14. Accordingly, there is no liquid left at the applicator after release of the plunger.

Because of the prevention of passage of fluid from the interior of the vessel during the movement of the piston into the metering well and due to the restricted orifice, a rapid movement of diaphragm 26 to produce presssure rise in the vessel proper is not productive of a corresponding and equal pressure rise in the metering chamber and orifice. In other words, the fluid pressure caused by the diaphragm 26 in the compressive movement is confined in the main body and that in the chamber 14 is controlled by the piston 21 alone, being damped by the orifice. Accordingly, the dispensing function is not productive of an excessive spurt of fluid.

In the position of Figure 1 the liquid passes freely into the metering chamber 14 between the cylinder rim and the piston 21. When the piston is displaced downward, the closeness of the cylinder wall increasingly restricts the liquid flow therebetween into chamber 14, and, with a sufficiently tight fit, no flow or pressure transmission takes place.

For purposes of low cost construction slight friction clearance is tolerable because the end of the piston 21, when fully displaced downwardly, abuts the upper end of the valve seat 8 to again close off the liquid. In this position a loose fitting piston also permits release of liquid drop by drop if there is no air seal corresponding to diaphragm 26.

I claim:

1. In a dispenser, a cylindrical shell having a flexible diaphragmatic closure to close one end of the cylinder, a tapered portion providing an axial port with an exteriorly disposed valve seat recess forming the other end closure of the cylinder, an axially disposed cylindrical metering chamber communicating with said port and disposed inwardly of said shell, a deformable valve seat in said recess; a reciprocating member having valve means for cooperation with the seat, a stem portion passing through said port, a piston portion for separating liquid from the interior of the shell and forcing it from said metering chamber, and a plunger extending from the piston portion to the diaphragmatic closure; and spring means for closing said valve, deforming said seat, and communicating the metering chamber with the main chamber of said shell.

2. In a valved dispenser; a valve comprising a cylindrical deformable packing, a valve head, a stem for actuating said head passing freely through the deformable packing, the arrangement being such that in seating the valve head against the packing the packing is forced to form a tight fit with the stem.

3. A dispenser comprising a generally cylindrical shell having a conoidally shaped dispensing end closure and a flexible end closure, a cylinder formed within said shell axially from said dispensing end, a piston and valve for trapping fluid within said cylinder, and means actuable through said flexible closure for actuating said valve and piston to release and dispense the trapped fluid.

ALBERT J. ROGER.